A. G. LINDLEY.
VEHICLE HEADLIGHT STEERING GEAR.
APPLICATION FILED DEC. 4, 1909.

974,579.

Patented Nov. 1, 1910.

2 SHEETS—SHEET 1.

WITNESSES:
Edward Thorpe.

INVENTOR
Arthur G. Lindley
BY
ATTORNEYS

A. G. LINDLEY.
VEHICLE HEADLIGHT STEERING GEAR.
APPLICATION FILED DEC. 4, 1909.
974,579.
Patented Nov. 1, 1910.
2 SHEETS—SHEET 2.
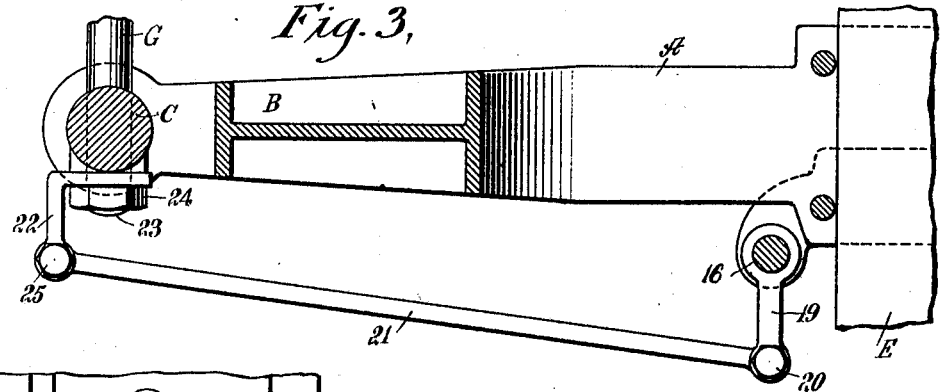
Fig. 3.
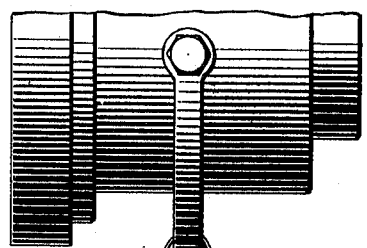
Fig. 4.
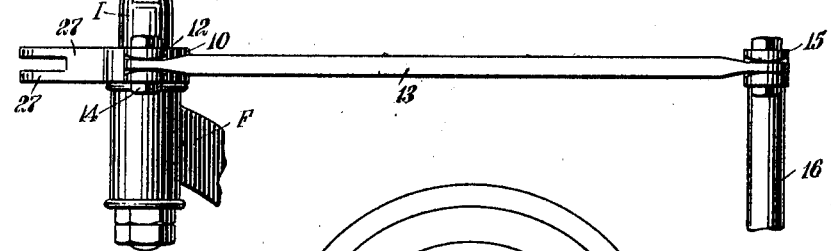
Fig. 5.
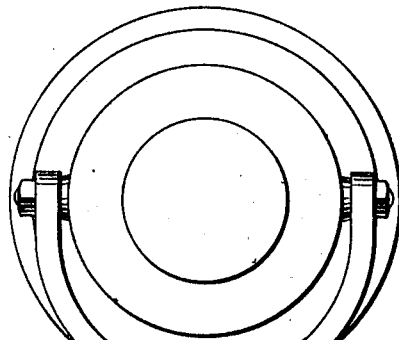
WITNESSES:
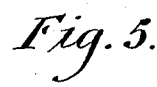
Edward Thorpe
INVENTOR
Arthur G. Lindley
BY
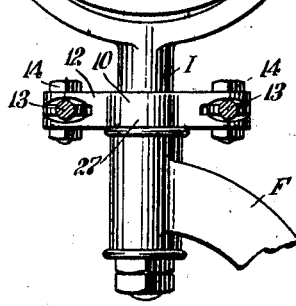
ATTORNEYS

UNITED STATES PATENT OFFICE.

ARTHUR G. LINDLEY, OF SCHENECTADY, NEW YORK, ASSIGNOR OF ONE-HALF TO THOMAS F. MacGREGOR, OF SCHENECTADY, NEW YORK.

VEHICLE-HEADLIGHT-STEERING GEAR.

974,579. Specification of Letters Patent. Patented Nov. 1, 1910.

Application filed December 4, 1909. Serial No. 531,321.

*To all whom it may concern:*

Be it known that I, ARTHUR G. LINDLEY, a citizen of the United States, and a resident of Schenectady, in the county of Schenectady and State of New York, have invented a new and Improved Vehicle-Headlight-Steering Gear, of which the following is a full, clear, and exact description.

Among the principal objects which the present invention has in view are: To provide an attachment whereby a lamp is rotated with the steering wheels of the vehicle to cast the light at all times in the path to be traveled by the vehicle; to provide means for revolving the lamps with which a vehicle is provided in unison with the movement of the steering wheels around their pivotal mounting; to provide a construction whereby the connected parts of the light steering gear are permitted to work in their joints without jar; to provide a construction for rotating the lamps laterally and in advance of the rotation of the steering wheels; and to provide a construction for the said light steering gear which is simple, durable and efficient.

One embodiment of the present invention is disclosed in the structure illustrated in the accompanying drawings, in which like characters of reference denote corresponding parts in all the views, and in which—

Figure 1:
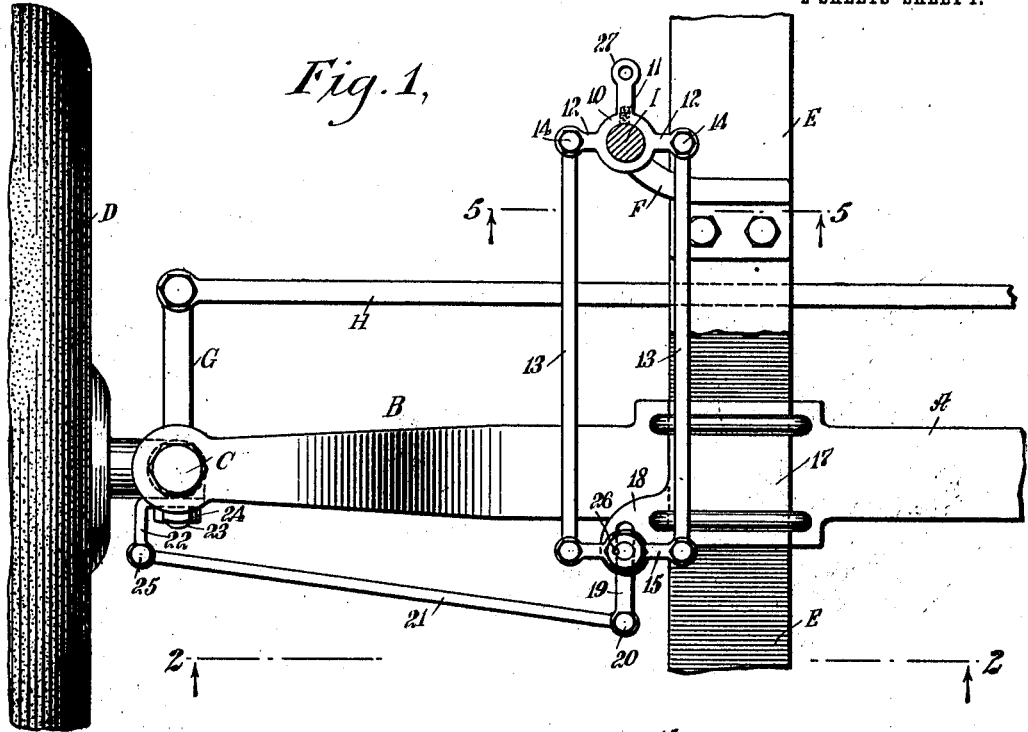
Figure 2:
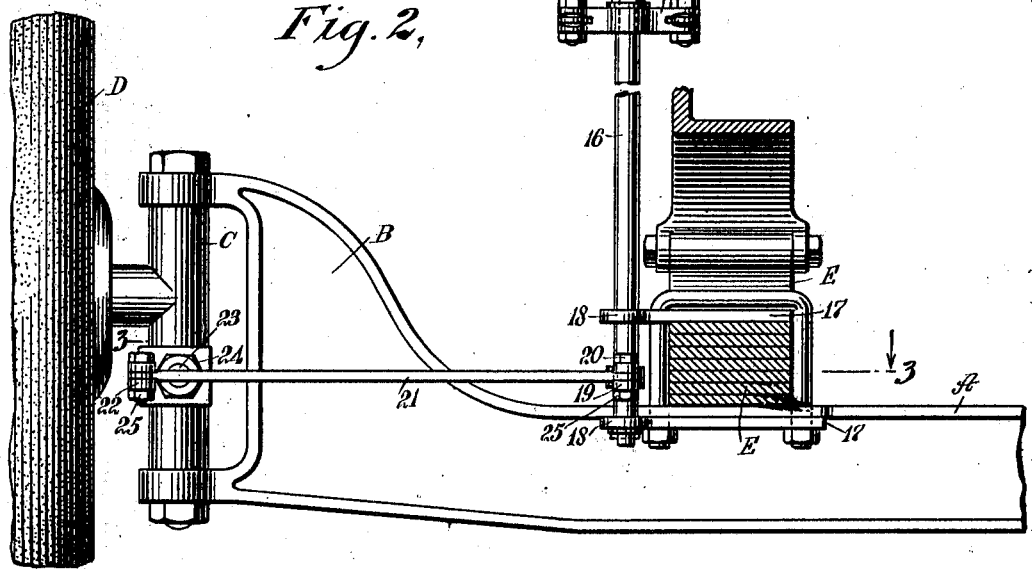

Figure 1 is a fragmentary view in plan of the end of a front axle, the steering gear, the lamp bracket, and the light shifting mechanism constructed and arranged in accordance with the present invention; Fig. 2 is an elevation partly in section on the line 2—2 in Fig. 1, of a fragment of the front axle of a vehicle having a steering wheel connected therewith, and the light shifting mechanism; Fig. 3 is an enlarged view in horizontal section, taken on the line 3—3 in Fig. 2; Fig. 4 is an enlarged fragmentary view in side elevation of the lamp, the end of the lamp bracket, and the parallel shifting links; and Fig. 5 is an enlarged detail fragmentary view partly in section on the line 5—5 in Fig. 1, of the lamp, the lamp yoke, the end of the lamp bracket, and the parallel shifting bar connection.

Where the headlights are stationarily mounted on the vehicle, as at present, the light is thrown steadily in front of the straight path followed by the vehicle. When the steering wheels are shifted to lead the vehicle upon a curved path, the body of the machine is gradually brought around on the curve, but the extension of the body is tangential to the curve. As the light is projected in the line of the extension of the body, it is projected to the side of the curved path being followed, the path remaining in actual darkness during the swing to and on the curve. It is obvious that this is a serious objection, particularly when on a strange road and running at a high speed. By means of the present invention the light is steered as the wheels are steered, in the direction in which the vehicle is to travel. The present construction also provides for steering the light slightly in advance of the wheels; that is, to throw the light into the area at the side of the traveled path slightly in advance of the wheels being shifted to follow the same path. In this manner is provided means whereby the driver sees in advance the road into which he is driving.

The light steering gear herein shown and described is attached to automobiles of usual construction, wherein is employed an axle A which is provided with a knuckle yoke B; a knuckle pivot C; a wheel D; a spring E; a lamp bracket F; a bracket shaft G; a parallel rod H; and lamp post I. The lamp post I, when provided with the steering gear herein shown and described, is extended through a clamping arm 10. The clamping arm 10 is fixedly held on the lamp post I by means of a set screw 11, and is provided with lateral extensions 12, 12, to which parallel links 13, 13 are secured. The ends of the extensions 12, 12 are bifurcated, and the adjacent surfaces of the bifurcated portions are coned, as shown particularly in Fig. 4 of the drawings. The bifurcated extensions are perforated to receive pivot bolts 14, 14, which pass loosely through a perforation formed in the outer end of the links 13, 13. The links 13, 13 are preferably equal in length and are secured to a rocking bar 15, the lateral extensions of which are duplicated in construction to that shown as the extensions 12, 12 of the clamping arm 10. By means of this construction the clamping arm 10 and rocking bar 15 are permitted independent vertical movement. This is necessitated because the pivot post 16 and the lamp post I are each held in a constant vertical position, but by reason of the connection through the spring E the two members vibrate vertically at different periods of time. The flexible connections thus formed between the arm 10 and bar 15 accommodate, without cramping, the said vibration. The pivot post 16 is suitably mounted in bearings formed in spring saddle plates 17, 17. The saddle plates 17, 17 are provided with projected ears 18, 18, which are perforated to form the bearings for the pivot post 16. Suitably mounted upon and extended from the lower end of the pivot post 16, is a lever arm 19. The outer end of the lever arm 19 is bifurcated and perforated to receive a pivot bolt 20, which is likewise passed through the contracted end of a connecting rod 21. The lever arm 19 is extended in the line of extension of the vehicle and parallel with the extension of a bracket 22. The bracket 22 is fixedly mounted upon the knuckle pivot C by means of a bolt 23 and nut 24, in the manner shown particularly in Figs. 2 and 3. The connecting rod 21 is pivotally attached to both the bracket 22 and the arm 19 by screw bolts 25, 25.

The bracket 22 is so constructed that the distance between the pivotal connection of the rod 21 therewith and the center of the knuckle pivot, slightly exceeds the distance between the center of the pivot post 16 and the pivotal connection of the lever arm 19 with the connecting rod 21. The arc of movement, therefore, of the bracket 22 slightly exceeds in length the arc of the movement of the arm 19, when forming the same angle. The result of the difference in the length of the axis is, that the angle of the movement of the arm 19 slightly exceeds the angle of the movement of the bracket 22, and the wheel D connected with the knuckle pivot C. In this manner is the light shifted slightly in advance of the shifting of the wheels when the machine enters upon or is running in a curved path.

The rocking bar 15 is rigidly secured in position upon the pivot post 16, by driving set pins 26 between the threaded connections therewith. The lever arm 19 is secured fixedly upon the pivot post 16 by a suitable set screw or other convenient method.

In the usual method of mounting the steering gear herein described, each lamp is connected by means of the connecting rod 21 independently with the knuckle pivot C to which the said lamp is adjacent. This, however, may be modified by extending a connecting rod between the lever arm 27 of the head-light steering gear on the one side of the machine with the lever arm 27 of the steering gear on the other side of the machine. When this arrangement is made there is needed only one connecting rod 21, connecting the one only of the knuckle pivots C, as shown in the drawings.

The operation of a device of the character specified is as follows: Whenever the knuckle pivot C with which the bracket 22 is connected is rotated to shift the wheel carried thereby, the pivot post 16 is rotated by the lever arm 19 through the connection 21. Further, by reason of the fact that the radial extension of the pivotal connection of the rod 21 with the bracket 22 is longer than the radial extension of the pivotal connection of the rod 21 with the arm 19, the angle of movement of the lamp connected with the pivot post 16 is greater than the angle of movement of the wheel connected with the said knuckle pivot. The parts being thus arranged, when now the driver of a vehicle operates the wheel steering gear thereof to turn a curve, the light from the lamps carried by the vehicle is brought in line with the curved path to be traveled. This action, it will also be observed, occurs slightly in advance of the change to the curved path by the vehicle. When the end of the curve is reached, and gradually as the steering wheels are brought in straight line disposition, the lamp, or lamps, as the case may be, is, or are, brought to the position where it, or they focus in a straight line with the body extension of the automobile.

Having thus described my invention, what I claim as new and desire to secure by Letters Patent is:—

1. A vehicle headlight steering gear, comprising a lamp, a pivot post therefor, a bracket for said pivot post fixedly attached to the body structure of the vehicle to move therewith, a second pivot post, a bracket for said second post fixedly attached to the running gear of the vehicle to move with the axle thereof and arranged to dispose the said second post in line with the said first-mentioned post and directly at the rear thereof, means operatively connecting said pivot posts to rotate the same in unison, and means for connecting the pivot of the steering wheel with the second of said posts to rotate said pivot and said post in unison.

2. A vehicle headlight steering gear, comprising a lamp, a pivot post for said lamp, a bracket for said post mounted upon the body of the vehicle to move therewith, a second pivot post, a bracket for said second post mounted upon the running gear of the vehicle to move with the axle thereof, said bracket disposed in such manner as to locate said second post in line with the said first-mentioned post and equidistant from the longitudinal center of the body of the vehicle, lateral extensions fixedly mounted on both of said posts, a tie rod pivotally connecting said lateral extensions to rotate said posts in unison, an extension mounted on the steering wheel of the vehicle, an extension mounted on said second post in substantial parallel disposition to the extension on said steering wheel, and a tie rod connecting said extension mounted on the second post to rotate the said second post in unison with said steering wheel.

3. A vehicle headlight steering gear, comprising a pivotal member fixedly mounted upon the running gear to move with the axle thereof, means connecting the steering wheel and said pivot member to produce in said member a rotation proportioned to the shift of said wheel, a lamp, a pivotal support for said lamp mounted to move with the body of the vehicle, said support being disposed in line with said pivotal member and equidistant therewith from the longitudinal center of said vehicle, extensions mounted on said pivotal member and said support, and means pivotally connecting said extensions to move the said member and support in unison.

In testimony whereof I have signed my name to this specification in the presence of two subscribing witnesses.

ARTHUR G. LINDLEY.

Witnesses:
E. F. MURDOCK,
THOMAS F. MACGREGOR.